Patented Jan. 5, 1943

2,307,058

UNITED STATES PATENT OFFICE 2,307,058

BREAKING AGENT FOR EMULSIONS

August Moeller, Frankfort-on-the-Main-Griesheim, Germany; vested in the Alien Property Custodian No Drawing. Application June 7, 1938, Serial No. 212,331. In Germany June 8, 1937

8 Claims. (Cl. 252—342)

The present invention relates to a breaking agent for emulsions from crude petroleum and salt water and to a breakage of said emulsions.

When petroleum is produced, there are obtained in an increasing amount products consisting of an emulsion of salt water and oil. These emulsions are often so stable that they do not separate into salt water and oil even after standing for several days at a raised temperature. It is, therefore, necessary to break them by various expedients, for instance:

(1) Merely mechanically by centrifuging the emulsion in a high-speed centrifuge;

(2) Electrically by treating the emulsion with alternating current of a high voltage;

(3) Physico-chemically by adding to the emulsion certain chemical reagents which probably alter the relations of the interfacial tension at the boundary between salt water and oil, disturb the equilibrium and thus cause the salt water to flocculate from the oil and the drops of salt water to run together so that the aqueous portion may be separated from the oil.

Centrifuges consume much power and have a low efficiency. The electric method requires a complicated apparatus. On the other hand the physico-chemical method may be carried out in the storage tanks. For this reason the breaking by chemical reagents is generally preferred and the two other methods are only applied if the crude petroleum to be treated can be separated particularly readily in the centrifuge or in an electrical apparatus or if the known chemical breaking agents have failed to work. The chemical breaking agents do not uniformly act on all the crude pertroleum so that different reagents must often be used for different emulsions.

Furthermore for all three methods the crude petroleum has generally to be heated in order to accelerate the separation of the salt water by reducing the viscosity. In this case the breaking by means of chemical reagents has the advantage that in the closed settling tank a loss due to evaporation of the readily volatile constituents can be avoided more readily than in a centrifuge or an electric separator.

A great variety of substances has already been suggested as chemical breaking agents, especially simple or complicated soaps and sulfonates, furthermore keto-fatty acids and the derivatives thereof, esters, phenols, amines, finally inorganic substances, caustic alkalies, acids or the like. Only the soaps and sulfonates, however, have become of importance.

Now I have found that many different petroleum emulsions may be broken particularly advantageously by means of the products of the action of alkylene oxides on aliphatic or aromatic compounds having hydroxyl groups, carboxyl groups or amino groups, i. e hydroxy-polyalkoxy compounds. The amount of such product required is very small; 500 grams of the product per metric ton of crude petroleum may be the upper limit; in most cases 200 to 300 grams per ton are sufficient if the breaking is carried out in the usual manner by allowing the emulsions to stand for about 24 hours at 50° C. to 60° C. after the addition of the breaking agent.

In some cases the addition required may even be reduced to 100 grams and less; in these cases it is possible to attain the breakage already within 4 to 6 hours by an increased addition, about 200 to 300 grams per ton of crude petroleum, so that the space within the tank can be better utilized.

As the products used are soluble in water and in oil they may be added to the crude petroleum in any desired manner, for instance directly.

The new reagents cause a substantially complete breaking. The two phases distinctly separate from each other; no considerable amount of merely flocculated material remains at the boundary to impede the complete removal of the oil. In cases where other breaking agents have been added and have failed to work it is possible, in spite of the presence of these other agents, completely to separate the salt solution still present by a subsequent addition of one or other of the substances prescribed by this invention in the proportion required if that substance is used alone.

The following examples serve to illustrate the invention, but they are not intended to limit it thereto.

For the examples crude petroleum emulsions of Roumanian origin having the following properties were used:

| Crude petroleum emulsions | Specific gravity | Salt water content in liters per metric ton | Salt content in kilograms per metric ton |
|---|---|---|---|
| A | 0.850 | 90 | 10.8 |
| B | 0.890 | 174 | 27.0 |
| C | 0.945 | 420 | 31.5 |
| D | 0.935 | 340 | 67.5 |
| E | 0.875 | 108 | 20.5 |
| F | 0.908 | 350 | 57.5 |
| G (pre-treated) | 0.860 | 48 | 8.8 |

(1) 1 ton of crude petroleum emulsion A is treated with 300 grams of a product obtained by the treatment of a commercial mixture of higher alcohols, hexyl alcohol to octyl alcohol, with 8 mol of ethylene oxide. After the whole has been allowed to stand for about 24 hours at 50° C. to 60° C. the emulsion separates into its two phases.

(2) 1 ton of crude petroleum emulsion B is mixed with 500 grams of a montanic alcohol treated with 20 mol of ethylene oxide. After the mixture has stood for about 24 hours at 50° C. to 60° C. the emulsion is completely broken.

(3) 1 ton of the same emulsion B can be broken in 24 hours at 50° C. to 60° C. with 300 grams of an iso-octylphenol treated with 8 mol of ethylene oxide so that the salt water and the oil are separated.

(4) By the addition of 300 grams of a hexyl-phenyl-polyglycolic ether with 13 mol of ethylene oxide to 1 ton of crude petroleum emulsion C, the latter is completely separated into the two phases within 24 hours at 50° C. to 60° C.

(5) A butyl-phenyl-polyglycolic ether with 30 mol of ethylene oxide causes at 50° C. to 60° C. a complete breakage of the emulsion D within 24 hours if 200 grams of the ether are added to 1 ton of the emulsion.

(6) The emulsion A is completely broken within 24 hours at 50° C. to 60° C. if 200 grams of ricinoleic acid treated with 20 mol of ethylene oxide are added to 1 ton of the emulsion. 250 grams of ricinoleic acid treated with 20 mol of ethylene oxide added to 1 ton of the emulsion C cause a complete breaking of the emulsion within 24 hours.

(7) 100 grams of a product from castor oil and 40 mol of ethylene oxide break 1 ton of the emulsion B completely in 24 hours at 50° C. to 60° C. With 50 grams of the same product the emulsion D is broken in the same time under the same conditions. 200 grams of the same product added to 1 ton of the emulsion D cause a complete breakage in 3 to 4 hours.

(8) 400 grams of a product obtained by treating colophony with about 8 to 12 mol of ethylene oxide added to 1 ton of crude petroleum break the emulsion C completely within 24 hours at 50° C. to 60° C.

(9) 300 grams of a product from sperm oil alcohol and 28 mol of ethylene oxide cause the separation into the two phases of 1 ton of the emulsion E within 24 hours at 40° C. to 50° C.

(10) 400 grams of oleic acid treated with 6 mol of ethylene oxide and added to 1 ton of the emulsion C cause a breakage of the emulsion within 24 hours.

(11) 250 grams of a product from stearylamine with 7 mol of ethylene oxide cause a complete breakage of 1 ton of the emulsion F within 24 hours at 50° C. to 60° C.

(12) The emulsion G is one which has been pre-treated with a breaking agent based on a sulfonate, but still retains much of the salt water. By an addition of 300 grams of a product obtained by treating alkyl phenol with 30 mol of ethylene oxide, to 1 ton of the pre-treated emulsion the salt water still present can be separated within 24 hours.

(13) 200 grams of castor oil treated with 12 mol of propylene oxide are added to 1 ton of the emulsion D and cause a complete breaking of the emulsion within 24 hours at 50° C. to 60° C.

I claim:

1. Breaking agent for emulsions from crude petroleum and salt water consisting of hydroxy-polyalkoxy compounds obtained by the action of an alkylene oxide upon an organic compound of the general type R—X, wherein R stands for a radical selected from the group consisting of alkyl, aryl and aralkyl radicals and X stands for a radical selected from the group consisting of hydroxyl, carboxyl and amino groups.

2. Breaking agent for emulsions from crude petroleum and salt water consisting of hydroxy-polyalkoxy compounds obtained by the action of alkylene oxide in a quantity of at least 6 mol upon an organic compound of the general type R—X, wherein R stands for a radical selected from the group consisting of alkyl, aryl and aralkyl radicals and X stands for a radical selected from the group consisting of hydroxyl, carboxyl and amino groups.

3. In the breaking of emulsions from crude petroleum and salt water the step which comprises adding a small quantity of hydroxy-polyalkoxy compounds to the emulsions, which compounds are obtained by the action of an alkylene oxide upon an organic compound of the general type R—X, wherein R stands for a radical selected from the class consisting of alkyl, aryl and aralkyl radicals and X stands for a radical selected from the class consisting of hydroxyl, carboxyl and amino groups.

4. In the breaking of emulsions from crude petroleum and salt water the step which comprises adding a small quantity of hydroxy-polyalkoxy compounds to the emulsions, which compounds are obtained by the action of an alkylene oxide in a quantity of at least 6 mol upon an organic compound of the general type R—X, wherein R stands for a radical selected from the class consisting of alkyl, aryl and aralkyl radicals and X stands for a radical selected from the class consisting of hydroxyl, carboxyl and amino groups.

5. In the breaking of emulsions from crude petroleum and salt water the steps which comprise adding a small quantity of hydroxy-polyalkoxy compounds to the emulsions, which compounds are obtained by the action of an alkylene oxide upon an organic compound of the general type R—X, wherein R stands for a radical selected from the class consisting of alkyl, aryl or aralkyl radicals and X stands for a radical selected from the group consisting of hydroxyl, carboxyl and amino groups, and allowing the emulsions to stand at about 50° C.

6. Breaking agent for emulsions from crude petroleum and salt water consisting of an alkyl-phenyl-polyglycolic ether obtained by the hydroxy-polyethoxylation of an alkyl-phenol with 30 mol of ethylene oxide.

7. Breaking agent for emulsions from crude petroleum and salt water consisting of the resultant product of the hydroxy-ethylation of castor oil with 40 mol of ethylene oxide.

8. Breaking agent for emulsions from crude petroleum and salt water consisting of the resultant product of the hydroxy-polyethoxylation of stearyl amine with 7 mol of ethylene oxide.

AUGUST MOELLER.